(12) United States Patent
Hall

(10) Patent No.: US 8,100,037 B2
(45) Date of Patent: Jan. 24, 2012

(54) MILLING HEAD AND METHODS FOR TUBE END PREPARATION

(75) Inventor: J. Randall Hall, Wadsworth, OH (US)

(73) Assignee: H&S Tool, Inc., Wadsworth, OH (US)

( * ) Notice: Subject to any disclaimer, the term of this patent is extended or adjusted under 35 U.S.C. 154(b) by 1840 days.

(21) Appl. No.: 11/256,125

(22) Filed: Oct. 21, 2005

(65) Prior Publication Data

US 2007/0110531 A1    May 17, 2007

(51) Int. Cl.
  *B23C 3/12*  (2006.01)
  *B26D 1/12*  (2006.01)
(52) U.S. Cl. ............................ 82/113; 407/48
(58) Field of Classification Search ............ 408/79, 408/80, 201, 203.5, 233, 713; 82/1.11, 113; 407/48; 409/132, 138
See application file for complete search history.

(56) References Cited

U.S. PATENT DOCUMENTS

| | | | |
|---|---|---|---|
| 1,204,994 A | 11/1916 | Kendall | |
| 2,641,944 A * | 6/1953 | Laffoon | 81/9.51 |
| 3,051,059 A | 8/1962 | Davey | |
| 3,075,219 A * | 1/1963 | Ott | 15/104.04 |
| 3,157,076 A | 11/1964 | Arthur | |
| 3,228,268 A | 1/1966 | Strout | |
| 3,396,467 A * | 8/1968 | Scocozza | 30/95 |
| 3,636,803 A * | 1/1972 | Miller | 82/113 |
| 3,976,388 A | 8/1976 | Webb | |
| 3,999,452 A * | 12/1976 | Larsen | 82/113 |
| 4,091,699 A | 5/1978 | Chaze et al. | |
| 4,192,067 A | 3/1980 | Calhoun et al. | |
| 4,364,290 A | 12/1982 | Astle | |
| 4,437,366 A | 3/1984 | Astle | |
| 4,449,871 A | 5/1984 | Hillestad | |
| 4,459,883 A | 7/1984 | Astle | |
| 4,486,131 A | 12/1984 | Eckle | |
| 4,498,820 A | 2/1985 | Brennen | |
| 4,601,222 A | 7/1986 | Gill | |
| 4,633,555 A | 1/1987 | Legge | |
| 4,689,920 A | 9/1987 | Geise | |
| 4,691,600 A | 9/1987 | Carlson et al. | |
| 4,718,201 A | 1/1988 | Legge | |

(Continued)

FOREIGN PATENT DOCUMENTS

GB    2092934 A    8/1982

OTHER PUBLICATIONS

Babcock/Deutsche Babcock Catalog Pages, publication date purportedly Jan. 1992, 5 pages purportedly from Catalog.

*Primary Examiner* — Will Fridie, Jr.
(74) *Attorney, Agent, or Firm* — Hudak, Shunk & Farine Co. LPA

(57) ABSTRACT

A milling head for use in conjunction with a rotary milling tool that is utilized to perform an operation on a tube, preferably of a tube bank or tube wall of a boiler system. The milling head is utilized to remove material or film from the outer diameter of a tube, or place a bevel on a tube end, or both. In one embodiment, the milling head includes at least one outer diameter milling element and at least one bevel milling element that are adjustable in relation to each other as well as the milling head body. Methods for milling a tube are also described.

19 Claims, 4 Drawing Sheets

U.S. PATENT DOCUMENTS

| | | |
|---|---|---|
| 4,739,688 A | 4/1988 | Brennan et al. |
| 4,743,149 A | 5/1988 | Geise |
| 4,830,551 A | 5/1989 | Brennan et al. |
| 4,872,249 A | 10/1989 | VanderPol et al. |
| 4,889,454 A | 12/1989 | Hillestad et al. |
| 4,979,294 A | 12/1990 | Bowman et al. |
| 5,033,347 A | 7/1991 | Hillestad et al. |
| 5,044,075 A | 9/1991 | Brennan et al. |
| 5,211,212 A | 5/1993 | Carlson et al. |
| 5,304,018 A | 4/1994 | LaVanchy et al. |
| 5,314,270 A | 5/1994 | Lavancy et al. |
| 5,356,248 A | 10/1994 | Hillestad |
| 5,531,550 A | 7/1996 | Moruzzi |
| 5,542,177 A | 8/1996 | Hillestad |
| 5,733,075 A * | 3/1998 | Basteck .......................... 408/57 |
| 5,911,548 A | 6/1999 | Deiss et al. |
| 6,004,082 A | 12/1999 | Ruhlmann et al. |
| 6,739,807 B2 | 5/2004 | Robinson et al. |
| 6,955,507 B2 | 10/2005 | Hall |
| 6,957,936 B2 * | 10/2005 | Kress ............................ 408/181 |
| 7,140,816 B2 * | 11/2006 | Hall .............................. 409/138 |
| 7,313,992 B2 * | 1/2008 | Hall ................................. 82/46 |
| 7,360,975 B2 * | 4/2008 | Hall .............................. 409/138 |
| 2003/0141337 A1 | 7/2003 | Yu Chen |
| 2004/0234349 A1 | 11/2004 | Ueda et al. |
| 2005/0053440 A1 | 3/2005 | Hall |

* cited by examiner

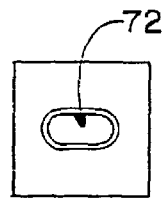
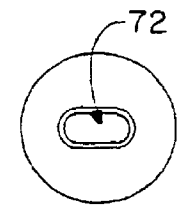
FIG.-10A    FIG.-10B
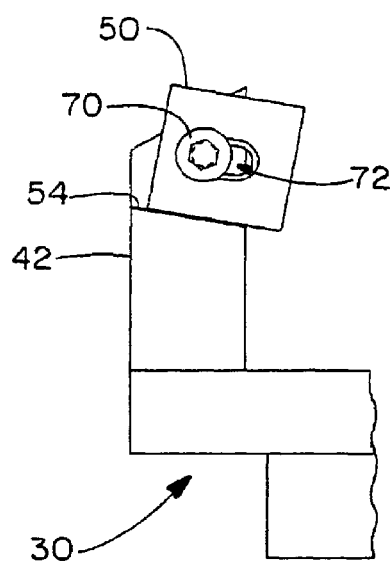
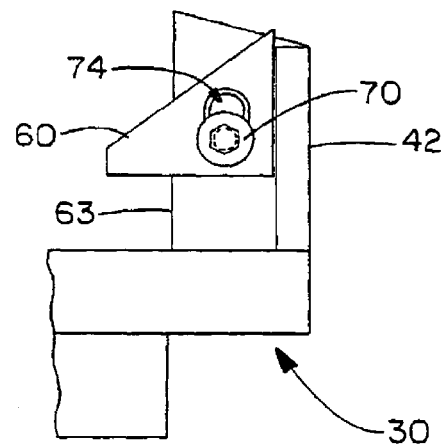
FIG.-11    FIG.-12

MILLING HEAD AND METHODS FOR TUBE END PREPARATION

FIELD OF THE INVENTION

The present invention relates to a milling head for use in conjunction with a rotary milling tool that is utilized to perform an operation on a tube, preferably of a tube bank or tube wall of a boiler system. The milling head is utilized to remove material or film from the outer diameter of a tube, or place a bevel on a tube end, or both. In a preferred embodiment, the milling head includes at least one outer diameter milling element and at least one bevel milling element that are adjustable in relation to each other as well as the milling head body. Methods for milling a tube are also described.

BACKGROUND OF THE INVENTION

Power generating or other plants circulate fluids, such as water or steam, through tubes or banks of tubes. The fluid is often heated and used, for example, to drive turbines which generate electricity.

The tubes are generally arranged in large panels or banks of parallel tubes which are connected together with a metal membrane or web continuously interposed between each pair of adjacent tubes in the bank to form a tube wall. The tubes generally have an outer diameter which can range from about 1 inch up to about 3 inches, with a wall thickness which can be up to about 0.5 inch. The web or membrane connecting adjacent tubes to each other generally has a thickness about equal to the wall thickness of the tubes, with the width of the webbing generally ranging from about 0.25 inch to about 0.75 inch. The webs or membranes are generally welded to the outer walls of adjacent tubes to form the tube banks. In some cases a weld overlay comprising a metal or alloy is present on portions of the tube bank in an effort to prevent corrosion or deterioration. The weld overlay is present on both sides of a tube bank in some embodiments. On account of deterioration due to corrosion and the like, the tubes occasionally require replacement. Ordinarily, repair of damaged or worn tubing involves cutting and removal of relatively large sections of the tube banks, and replacement with a new panel of tubes. The bank sections are generally replaced in large rectangular sections typically having sizes ranging from a few feet to 10, 20, 100 or even 200 feet in length.

The sections of tube banks which are to be replaced are generally cut out using a power saw or a cutting torch. A method and apparatus for cutting out a section of boiler tube wall is illustrated and described in U.S. Pat. No. 5,033,347, herein fully incorporated by reference.

After the damaged or worn section of tube wall which is to be replaced has been cut out and removed, it is necessary to properly prepare the tube ends exposed by removal of the old section before positioning the new tube bank section in the tube wall opening. Proper preparation of the exposed tube ends of the existing boiler tube wall requires chamfering or beveling of the exposed tube ends to facilitate a good weld between the new tube wall section and the existing boiler tube wall. More specifically, the adjoining tube ends of the existing tube wall and those of the new or replacement section of tube wall should be provided with a frustoconical bevel so that when the adjoining tube ends are placed in alignment, a circumferential groove is formed to receive molten metal from the welding rod. The replacement section of tube wall is usually fabricated and prepared for welding off-site before the damaged or worn section of existing tube wall is removed. The exposed tube ends of the existing tube wall, however, must be prepared for welding on-site, often in a confined space. It is highly desirable that all work performed on the existing tube wall be conducted as quickly and efficiently as possible so as to minimize the period during which the steam generator is taken out of service for repair. Accordingly, preparation of the exposed tube ends of the existing tube wall for welding is generally accomplished using portable hand-held milling tools such as those disclosed in U.S. Pat. Nos. 4,449,871 and 4,889,454, herein fully incorporated by reference.

To facilitate rapid and efficient chamfering or beveling of the exposed tube ends of the existing tube wall using conventional milling tools, and to provide ample space between vertically adjacent tubes for welding around the entire circumference of the tube ends, it is highly desirable and generally necessary to remove a portion of the membrane between each pair of exposed tube ends of the existing tube wall. Typically, it is desirable to remove the membrane between adjacent tube ends, which are exposed by removal of the damaged wall section, from the horizontally cut edge of the existing boiler tube wall to a depth which is at least equal to the depth of the frustoconical bevel which is to be milled at the tube end. Typically, membrane material is removed from the horizontally cut edge between two adjacent tubes to a depth of about ⅜ inch, about ¾ inch, or about 1 inch or more from the cut edge.

Membrane removal utilizing rotary milling tools on an existing tube of a tube wall has been limited to a cutting sweep equal to the outer radius of a tube. An example of a membrane milling head is set forth in U.S. Pat. No. 5,542,177 to Mark Hillestad. After the membrane material, weld overlay material removal, or outer diameter tube film removal, a frustoconical bevel is milled on the tube around the entire circumference thereof.

U.S. Pat. No. 6,955,507 to Hall relates a milling head adapted to remove tube material from the outer diameter of a tube, in addition to any membrane or weld overlay present on the surface of a tube. In a further embodiment, the milling head is adapted to place a bevel on a tube end.

Afterwards, a second tube with a corresponding bevel is matched with the first beveled tube and the tubes are welded together by molten metal or solder placed around the joined tubes, especially at the circumferential groove formed by the adjoined beveled tube ends.

It would be beneficial to form a strong durable weld between joined tubes having beveled or chamfered ends.

SUMMARY OF THE INVENTION

The present invention relates to a milling head adapted to be connected to a rotary milling tool. The milling head preferably includes an outer diameter milling element that can be adjusted in a track of a milling element support of the milling head and fixed at a desired location on the milling head. The outer diameter milling element is adapted to remove material from the outer portion, such as the outer diameter or circumference, of a tube end portion. The outer diameter milling element can also optionally remove membrane or overlay material if present on the outer surface of the tube. In one embodiment, the outer diameter milling element has at least one cutting edge adapted to mill from about 1% to about 50% of the tube radial thickness measured from the inner radius to the outer radius of the tube perpendicular to the central axis. The outer diameter milling element cutting edge(s) can be configured to impart a desired finish to a portion of the tube end.

The milling head preferably also includes a bevel milling element adapted to impart a beveled edge or finish on an edge of the tube. The bevel milling element can be adjusted in a channel of the milling element support of the milling head and fixed at a desired location and angle with respect thereto.

In a further embodiment of the present invention, a gauge is provided to assist a user in arranging and setting the milling elements of the milling head in a particular orientation. Methods for utilizing the gauge are described.

Accordingly, it is an object of the present invention to provide a milling head having milling elements adapted to remove tube material or film from an outer portion of the tube, or bevel a tube end, or combinations thereof.

A further object of the present invention is to provide methods for preparing or cleaning an end portion of a tube for a subsequent weld operation utilizing a milling head of the present invention. The tube material removal step provides a beneficial bonding surface without substantially weakening the tube.

Yet another object of the present invention is to provide a milling head having milling elements that can be easily adjusted in order to mill a desired finish on an end portion of a tube. A milling head is provided wherein an outer diameter milling element is adjustable in relation to the milling head. In an additional embodiment, a bevel milling element is provided that is adjustable in relation to the milling head. Milling heads of the present invention are capable of performing operations simultaneously thereby enabling a user to efficiently complete tube preparation.

A further object of the present invention is to provide methods for arranging or setting the milling elements of the milling head, particularly utilizing a gauge.

Accordingly, one aspect of the present invention relates to a milling head for a rotary milling tool, comprising a body adapted to be connected to a rotary milling tool, wherein the body has an annular recess, and one or more milling element supports connected to the body, wherein at least one milling element support includes a channel, wherein a bevel milling element having a cutting edge is adjustable in the channel, wherein the bevel milling element is connected to the channel, wherein at least one milling element support includes a guide, wherein an outer diameter milling element having a cutting edge is adjustable in relation to the guide, wherein the outer diameter milling element is connected to the guide, wherein the bevel milling element has an annular cutting sweep that is at least concentric with an inner end of a cutting sweep of the outer diameter milling element and radially inward a distance from the outer diameter milling element cutting sweep.

Another aspect of the invention is a milling head for a rotary milling tool, comprising a body having an annular recess, the body adapted to be connected to a rotary milling tool; one or more milling element supports connected to the body, wherein the milling element support includes a guide; and an outer diameter milling element having a cutting edge adapted to remove material from an outer diameter of a tube, wherein the outer diameter milling element is adjustable in relation to the guide and is secured between the guide and a fixing element, wherein the fixing element is connected to the milling element support by a securing element.

Yet another aspect of the invention is a milling head for a rotary milling tool, comprising a body adapted to be connected to a rotary milling tool; and at least one milling element support connected to the body, wherein the milling element support is spaced a distance from a central rotational axis of the milling head, wherein a recess extends a distance between the milling element support and the central rotational axis, wherein the milling element support includes a channel, and wherein the channel has a back wall that longitudinally extends in relation to the central rotational axis of the milling head at an angle of 0° to about 45°; and wherein a bevel milling element having a cutting edge adapted to mill a bevel on a tube is secured in the channel.

A further aspect of the invention is a method for milling a tube, comprising the steps of providing a tube having an end portion; providing a rotary tool having a milling head comprising a body adapted to be connected to a rotary milling tool, wherein the body has an annular recess, and one or more milling element supports connected to the body, wherein at least one milling element support includes a channel, wherein a bevel milling element having a cutting edge is adjustable in the channel, wherein the bevel milling element is connected to the channel, wherein at least one milling element support includes a guide, wherein an outer diameter milling element having a cutting edge is adjustable in relation to the guide, wherein the outer diameter milling element is connected to the guide, wherein the bevel milling element has an annular cutting sweep that is at least concentric with an inner end of a cutting sweep of the outer diameter milling element and radially inward a radial distance from the outer diameter milling element cutting sweep; adjusting at least one of the outer diameter milling elements or bevel milling elements in relation to the milling head body and securing the at least one element to the milling head; and milling the end portion of the tube by removing material from an outer diameter of the tube and placing a bevel on the end of the tube.

BRIEF DESCRIPTION OF THE DRAWINGS

The preferred embodiment of the invention, illustrative of the best mode which applicants have contemplated, is set forth in the following description and is shown in the drawings and is particularly and distinctly pointed out and set forth in the appended claims.

FIG. 10A is a front elevational view of one embodiment of a milling element having a slotted bore.

FIG. 10B is a front elevational view of one embodiment of a milling element having a slotted bore.

FIG. 11 is a partial side view of an outer diameter milling element having a slotted bore fixable at a plurality of positions with respect to a milling element support.

FIG. 12 is a partial side view of the bevel milling element having a slotted bore fixable at a plurality of positions with respect to a milling element support.

DETAILED DESCRIPTION OF THE INVENTION

Figure 1:
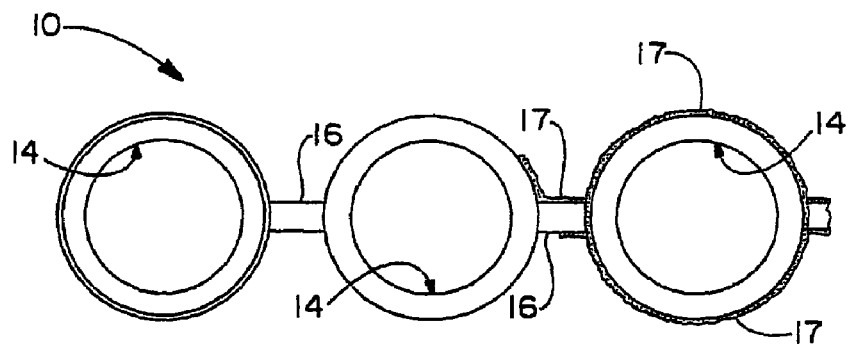
FIG. 1 is a top view of a portion of a tube wall illustrating tube ends, in various states of finish, which have been exposed by removal of a section of the tube wall.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
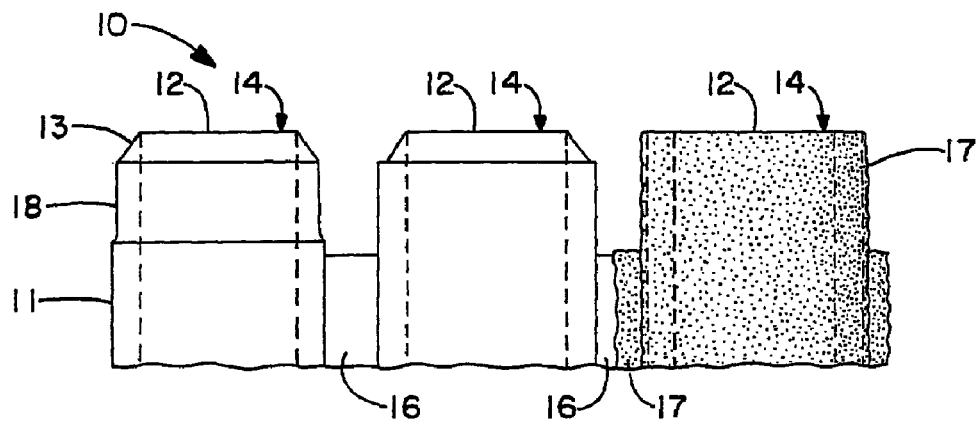
FIG. 2 is a front elevational view of the tube wall of FIG. 1.

There is shown in FIGS. 1 and 2 a portion of a boiler tube wall 10 from which a section has been cut out to expose tube ends 12. The boiler tube wall 10 is comprised of a row of parallel, typically vertically oriented tubes 14, each of which is connected to an adjacent tube by a web or membrane 16. The tubes 14 and membranes 16 are generally formed separately of metal or alloy such as steel and then welded together. Repair of boiler tube walls generally involves cutting out a section of the tube wall which is worn or damaged, chamfering or beveling the tube ends which have been exposed by removal of the worn or damaged section of tube wall, and welding a new or replacement section of tube wall in place of the damaged section which has been removed. The damaged section of tube wall is usually removed by making two horizontally spaced cuts transverse to the longitudinal direction of the tubes 14 and two vertically spaced cuts, which together with the horizontal cuts define a rectangular section which is to be replaced. Before a new or replacement section of the wall can be installed, it is necessary to prepare the tube ends for welding by first removing membrane material from between the tube ends, beveling the tube ends, and also performing a tube film removal or diameter cleanup step extending a predetermined distance below a beveled portion, or portion to be beveled. It is to be understood that the milling heads and methods of the invention apply to individual tubes, pipes, or the like, as well as two or more tubes connected such as in a tube bank.

In some embodiments, a tube will include a weld overlay 17, either on one or both sides of a tube wall as shown in FIG. 1. The weld overlay 17 is typically a metal coating, such as a pure metal, but more typically an alloy material such as Inconel® (Inco Alloy/Special Metals) or other alloy which are well known to the art and to the literature, applied to the tube wall to protect against tube corrosion and/or wear. The weld overlay 17 is of varying thickness as it is generally not precisely applied. Accordingly, the weld overlay 17 must be removed in some cases to prepare the tube ends 12 for welding, even though difficult to remove.

A milling head of the present invention is attached to a rotary milling device or power tool as known in the art. Rotary milling devices are well known in the art and are commercially available from sources such as H&S Tool of Wadsworth, Ohio. Examples of rotary milling tools include, but are not limited to, Model MB, Model MS, Model B, Model MT, and Model MFT. Rotary milling devices are generally electrically or pneumatically powered.

In one embodiment, a membrane cutting rotary milling head such as described in U.S. Pat. No. 5,542,177, herein fully incorporated by reference, is utilized to remove membrane material from between tubes. The inner radius of the annular cutting sweep of the membrane milling head is preferably greater than the outer radius of the tube wall to be milled. The membrane milling head is utilized to remove membrane 16 as well as any weld overlay 17 if present on the outer surface of the tube.

Figure 4:
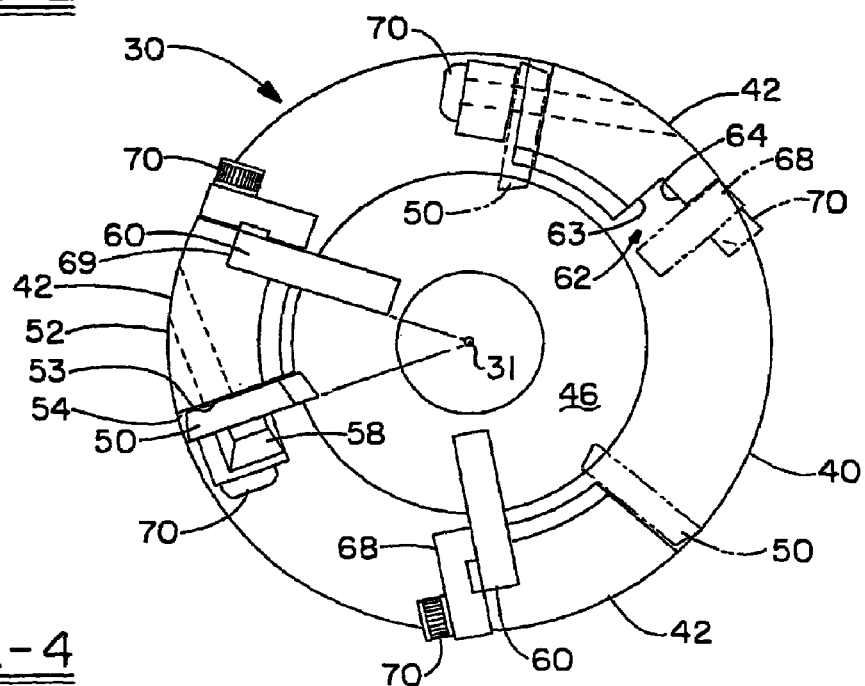
FIG. 4 is a bottom view of one embodiment of a milling head of the present invention.
Figure 3:
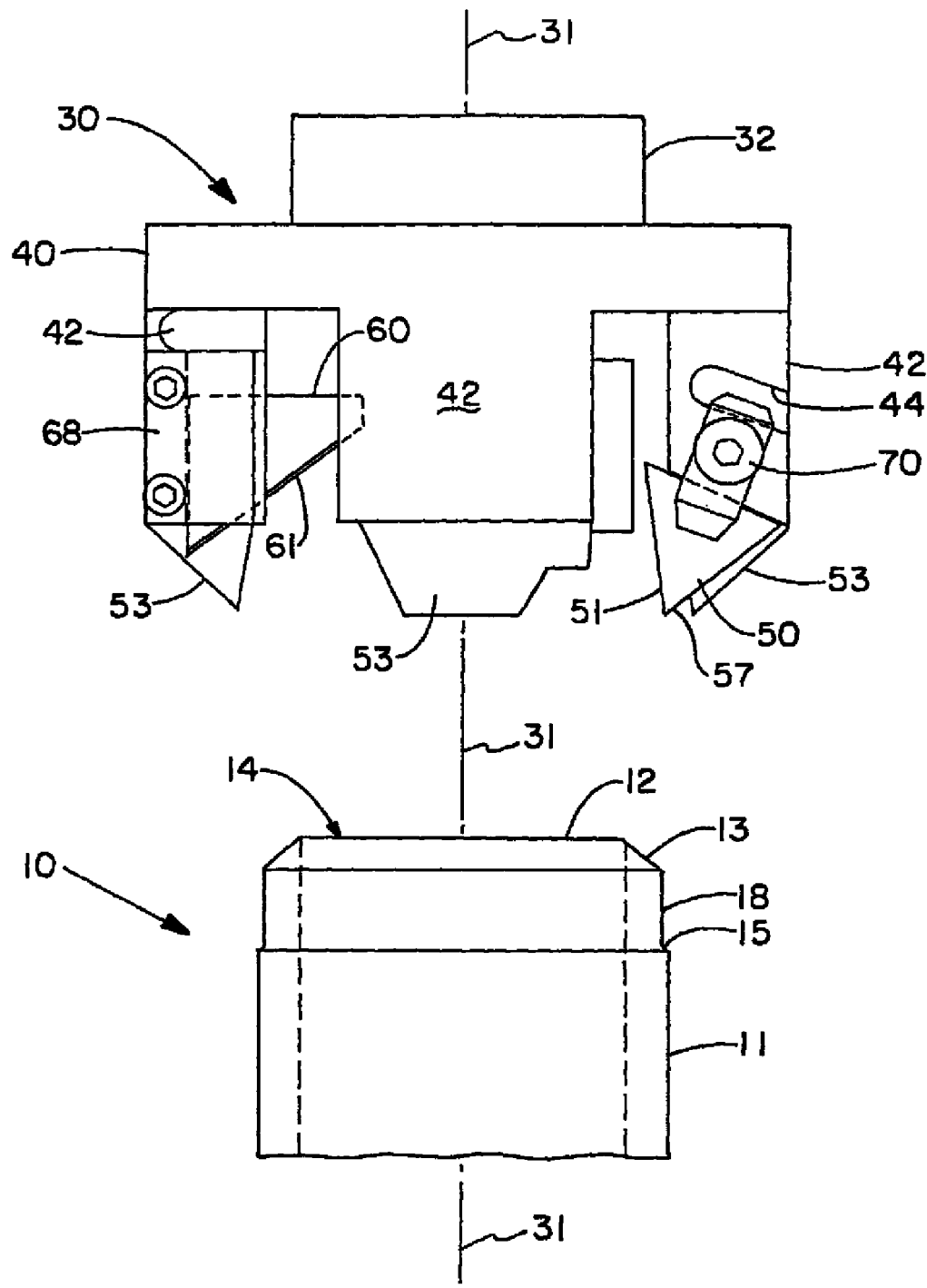
FIG. 3 is a side elevational view of one embodiment of a milling head of the present invention located above a tube milled therewith.
Figure 5:
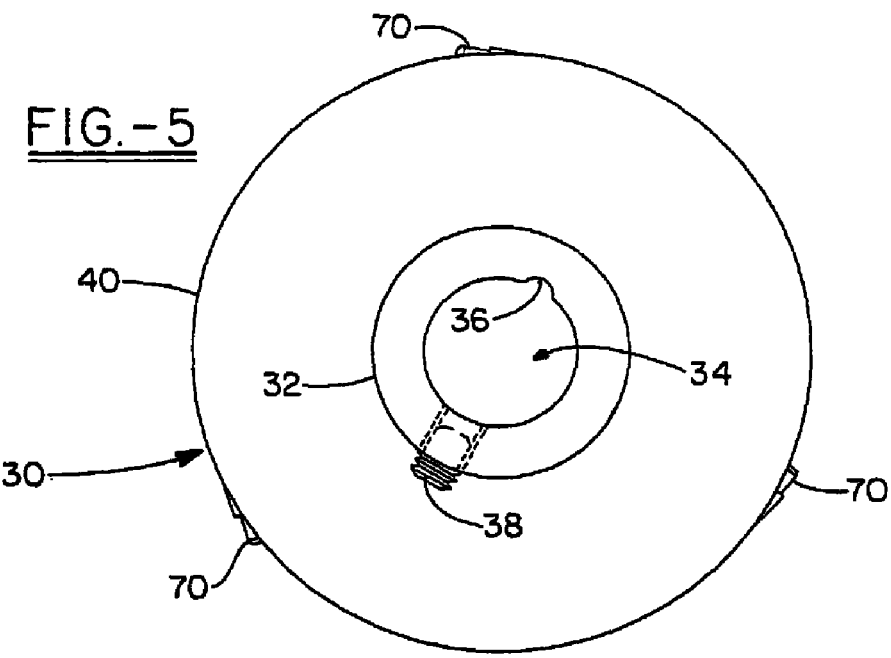
FIG. 5 is a top view of one embodiment of a milling head of the present invention.

In one embodiment of the present invention, as shown in FIGS. 3, 4 and 5, a milling head 30 is configured to mill a tube, pipe or the like and impart a desired finish thereto. Milling head 30 is adapted to place or impart a beveled edge or area 13 onto an end 12 of the tube 10, or remove tube material from the outer diameter of the tube 10, or a combination thereof, depending on the milling elements connected thereto, such as an outer diameter milling element 50 or a bevel milling element 60. The outer diameter tube material or film removal step cuts, grinds, shaves, abrades, or otherwise removes a film or thin annulus from the outer surface 11 of the tube 10, preferably substantially completely or completely around the circumference thereof. That is, a portion of the tube outer diameter is removed, preferably in addition to any weld overlay 17 material and/or membrane 16 material optionally present on or partially surrounding the tube 10 in the area where the diameter clean-up step is performed.

As shown in FIG. 5, the milling head 30 includes a tool mounting portion 32 at the upper end of milling head 30. Tool mounting portion 32 includes bore 34 which can be operatively connected to rotary gearing of a rotary milling tool. Bore 34 further allows for passage of a rod, a collet or other rotary tool securing mechanism, as known in the art, that can be utilized to operatively secure the rotary milling tool and thus rotary milling head 30 in relation to a tube 10 to be milled as known in the art. In one embodiment, bore 34 includes a key slot 36 which is adapted to matingly engage a key on the rotary milling tool to lock the milling head 30 to the rotary tool rotary gearing. Various other means for mounting a milling head are known in the art and can alternatively be utilized. Set screw 38 is optionally utilized to maintain engagement of the rotary milling tool with milling head 30.

The milling head 30 of the present invention has a configuration or design which allows the milling elements 50, 60 thereof to mill a portion of a tube 10, as well as any weld overlay 17 and/or membrane 16 that is present on one or more sides of the tube. The outer diameter milling element 50 has a cutting edge 51 which is self-cleaning and provides for continuous cutting of surfaces, especially continuous or semi-continuous surfaces such as, but not limited to, tube circumference, weld overlay and membrane. Self-cleaning cutting edges are known to the art and to the literature and have the ability to substantially prevent the head from seizing, catching, and/or stopping during operation but rather shed pieces, chips, or shavings, or the like away from the milling element cutting surfaces preferably allowing continuous, uninterrupted cutting and rotation.

Milling head 30 includes a base 40 that extends desirably in a radial direction, and preferably in a perpendicular direction when compared to central axis 31 about which the milling head is adapted to rotate. Base 40 is a platform to which the milling elements 50 and 60 are operatively connected, when present. One or more milling element supports 42 are connected to base 40 as shown in at least FIG. 3. Generally from 1 to about 10, desirably 2 to about 4, and preferably 3 supports 42 are utilized on milling head 30. An outer diameter milling element 50 or bevel milling element 60, or both, can be attached to each milling element support 42 if desired. The milling element support 42 extends a predetermined distance from base 40, preferably in a direction generally parallel to the central axis 31. The overall length of milling element support 42 can vary and generally depends upon the depth to which the outer diameter of the tube is to be milled, measured from the tube end. Milling element support 42 has a length generally from about 0.5 inches (1.27cm) to about 6 inches (15.24 cm), desirably from about 1 inch (2.54 cm) to about 4 inches (10.20cm), and preferably from about 1.5 inches (3.81 cm) to about 2.5 inches (6.35 cm). The outer portion of milling element support 42 is generally annular and preferably coextends circumferentially with base 40 as illustrated in FIG. 4. The milling element supports 42 are preferably arranged along or around the outer circumference of base 40, to allow a tube to fit within and be milled while in tube recess or bore 46.

Milling head 30 of the present invention includes outer diameter milling element 50 in one embodiment that is designed to remove tube material or film from the outer surface or diameter of the tube and optionally weld overlay 17 material, or membrane 16 material, or a combination thereof, to a predetermined depth measured from a tube end 12. Tube material is removed from the outer diameter to a depth measured from the tube end 12 of generally from about 0.25 inches (0.63 cm) to about 4 inches (10.20 cm) and desirably to a depth of from about 0.375 inch (0.95 cm) to about 1.5 inches (3.81 cm). The outer diameter milling element 50 includes one or more cutting edges 51, 57, see FIG. 6, that remove an outer radial portion of the tube in a range generally in an amount from about 1% or about 2% up to about 20%, or about 50%, desirably up to about 15%, and preferably up to about 5% or 10% of the total tube radial thickness (annulus) measured from the inner radius to the outer radius of the tube perpendicular to the central axis 31. The tube outer diameter material removal step exposes the clean, bare-metal surface on the outer portion of the tube in the milled area. Rust, scale, debris or the like is removed during the outer diameter tube milling step. The milled tube surface provides a strong bonding area for a subsequent welding operation.

Figure 6:
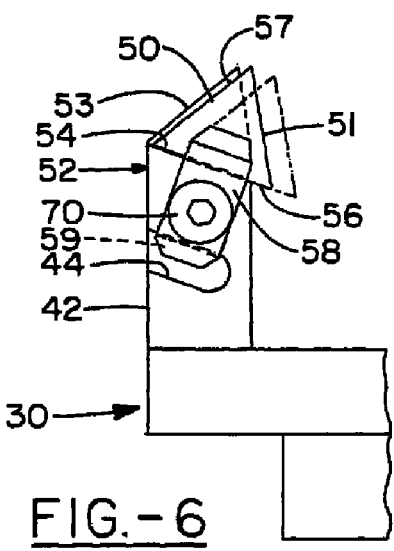
FIG. 6 is a partial side view of the outer diameter milling element at different positions with respect to a milling element support.

The outer diameter milling element 50 is connected to milling element support 42, such as shown in FIGS. 3, 4 and 6. Outer diameter milling element 50 can be adjusted to any of a plurality of positions on milling element support 42 and then fixed thereto. In a preferred embodiment, milling element support 42 includes an outer diameter milling element guide 52 having a back 53 which extends generally in a plane radial to central axis 31, as shown in FIG. 4, or another angle in relation thereto. Milling element support 42 includes a track 54 that extends from milling element support 42, preferably substantially perpendicular to the plane of back 53 as shown in FIG. 6, and can function as a seat or bench for outer diameter milling element 50 and also aids in co-aligning multiple milling elements 50, as each milling element support 42 is preferably provided with a track 54. The outer diameter milling element 50 has an edge 56 that is movable along track 54 in one embodiment in order to aid in setting outer diameter milling element 50 in a desired alignment.

Outer diameter milling element 50 is adjusted to a desired position on guide 52 and secured with fixing element 58. As illustrated in FIG. 4, the outer diameter milling element is secured between back 53 of support 42 and fixing element 58.

Fixing element 58 is secured to milling element support 42 through one or more securing elements 70, preferably a threaded screw or bolt connectable in a threaded bore of milling element support 42. Thus, fixing element 58 secures the outer diameter milling element 50 to the milling element support 42 at a desired location in relation thereto. It is preferred that a cutting edge 51 of outer diameter milling element 50 extends radially inward from milling element support 42 as shown in FIG. 6 to provide the desired outer diameter material removal. In one embodiment, the fixing element 58 has a foot 59, see FIG. 6 that extends into recess 44 of milling element support 42 that serves to aid in locking the fixing element 58 and outer diameter milling element 50 to milling element support 42. Guide track 54 extends longitudinally at an angle perpendicular to central axis 31, generally from about 0° to about 35°, desirably from about 0° to about 20°, and preferably from about 0° to about 15°. An angle of about 15° is shown in FIG. 6. The amount of material removed from the outer diameter of a tube by outer diameter milling element 50 can be controlled and precisely adjusted to obtain a desired result.

Outer diameter milling element 50 can have any shape or configuration, including, but not limited to, a triangle, a square, a rectangle, a circle, any geometric or non-geometric shape, or an element with one or more curved or angled surfaces or both, or combinations thereof, in order to impart a desired finish on the outer diameter of a tube. For example, a triangular outer diameter milling element 50 is illustrated in FIGS. 3, 4 and 6, and square and circular outer diameter milling elements 50 are illustrated in FIGS. 10A and 10B, respectively. In a preferred embodiment, it is desirable to provide an outer diameter milling element 50 having a cutting edge 51 that is adapted to impart a relatively non-abrupt curved, rounded, or arced shoulder 15 as shown in FIGS. 2 and 3, as opposed to a shoulder having about a 90° angle. In one embodiment, a triangular outer diameter milling element 50 is utilized to form the desired shoulder configuration as shown in FIG. 3. Outer diameter milling element 50 includes a cutting edge 51 having a longitudinal axis that is situated at an angle with respect to central axis 31, generally from about 0° to about 30°, desirably from about 2° to about 20°, and preferably from about 5° to about 15°. As illustrated in FIG. 3, the lower end of cutting edges 51 and 57 are utilized to create shoulder 15 on tube 10.

In a further embodiment, outer diameter milling element 50 is provided with an elongated or slotted bore 72, see FIGS. 10A, 10B and 11 for example. Outer diameter milling elements 50 having a slotted bore are preferably utilized with the elongated axis of the slot arranged parallel to milling element support track 54. As illustrated in FIG. 11, a securing element 70 connects outer diameter milling element 50 to an aperture in milling element support 42. Accordingly, the slotted bore 72 allows outer diameter milling element 50 to be adjusted in relation to milling element support 42 to provide a desired finish on a tube. The height of the slotted bore 72, i.e. perpendicular to the elongated axis, is preferably slightly greater than the diameter of the securing element 70 designed to secure the milling element 50 to the milling head 30. Slotted bore 72 is preferably countersunk to allow at least a portion of a head or end portion of the securing element, and preferably the entire end portion to be flush or recess mounted on the milling element 50 in a fastened position. The length of the slot can vary depending on the size of the outer diameter milling element and ranges generally from about 0.10 inch (0.25 cm) to about 0.30 inch (0.76 cm), desirably from about 0.15 inch (0.38 cm) to about 0.25 inch (0.64 cm), and preferably from about 0.18 inch (0.45 cm) to about 0.20 inch (0.51 cm).

In one embodiment, bevel milling element 60 is adjustably and removably connected to milling element support 42 in order to allow milling head 30 to mill a bevel onto an end of a tube, such as shown in FIGS. 1, 2 and 3. Bevel milling element 60 is capable of being secured to milling element support 42 at a plurality of positions in relation thereto as well as to base 40. In one embodiment, bevel milling element 60 is secured in a channel 62 of milling element support 42. Channel 62 is generally defined by side 63, back 64, and locking element 68. Back 64, formed generally as a wall, extends along milling element support 42 in a direction parallel to central axis 31 or at an angle with respect thereto, generally at an angle from about 0° to about 45°, desirably from 0° to about 20° and preferably 0° to 10° with respect to the central axis 31. In a preferred embodiment, one edge or portion of bevel milling element 60 is seated against back 64 and moved therealong to a desired position, and then secured to milling element support 42.

A portion of bevel milling element 60 is also adjustable in and along channel 62 in a plurality of directions in relation to central axis 31. Bevel milling element 60 is movable in a direction parallel and/or perpendicular to central axis 31 or back 64 or at an angle with respect thereto, and generally from about 0° to about 45°, desirably from 0° to about 20° and preferably 0° to 10° with respect to the central axis 31, so long as a portion of the bevel milling element 60 remains in channel 62 and can be secured to milling element support 42. Accordingly, the milling head 30 of the present invention is versatile and the bevel milling element 60 can be easily set at a desired position and secured by a user to achieve a desired bevel on a tube end.

Channel 62 of milling element support 42 includes at least one side 63, and a back 64 which generally faces central axis 31. In a preferred embodiment, the plane of side 63 is substantially radial to central axis 31 of milling head 30 as shown in FIG. 4. It is preferred that one end 69 of bevel milling element 60 abut back 64, but as disclosed hereinabove, the bevel milling element 60 is adapted to be placed a desired distance away from back 64 if required for a particular application.

Cutting edge 61 of bevel milling element 60 is arranged at a predetermined angle in relation to milling head 30 central axis 31 in order to provide a tube end with a desired frustoconical bevel angle. The cutting edge 61 is fixed at an angle generally from about 20° to about 60°, desirably about 30° to about 45°, and preferably about 37.50 in relation to central axis 31 of milling head 30. The bevel milling element 60, cutting edge 61 is generally positioned at a radial distance at least equal to and inward from the innermost cutting surface of outer diameter milling element 50, as illustrated in FIG. 4, and further extending inwardly a predetermined distance toward central axis 31. The actual annular cutting sweep of the at least one bevel milling element 60 is generally at concentric with, i.e. at least equal in radius to, and further extending a distance radially inward of the cutting sweep of outer diameter milling element 50 cutting edge 51 in order to provide a tube end 12 that transitions directly from a beveled area 13 to an area 18 where the outer diameter tube film has been removed, as shown in FIG. 3.

In one embodiment, bevel milling element 60 is secured directly to milling element support 42 by a securing element 70, such as illustrated in FIG. 12, preferably through side 63. The securing element 70 is placed through an aperture in bevel milling element 60 and secured in a bore, preferably threaded, in milling element support 42. The aperture 74 can be sized to only accommodate securing element 70 or can be elongated to further allow for adjustment of the bevel milling element 60. In one embodiment, a plurality of bores are present on milling element support 42, spaced at predetermined increments to provide for multiple securing locations for bevel milling element 60.

Figure 7:
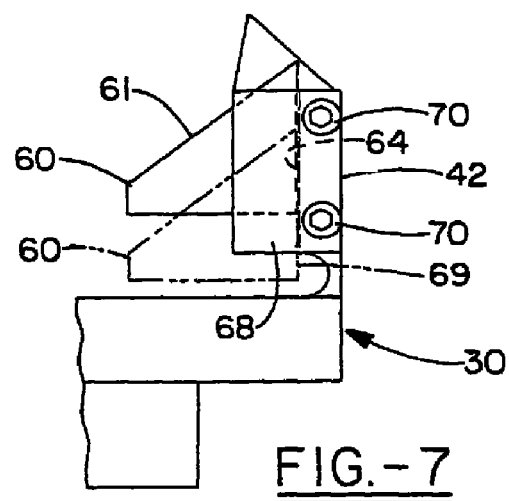
FIG. 7 is a partial side view of the bevel milling element at different positions with respect to a milling element support.

Alternatively and preferably, channel 62 of milling element support 42 includes a locking element 68 as shown in FIGS. 3, 4 and 7 which secures bevel milling element 60 to the milling element support 42. Locking element 68 is secured to milling element support 42 via one or more securing elements 70, thereby fixing the bevel milling element 60 to the milling element support 42 at a desired location in relation thereto with a pressure or compression fit which prevents movement of the bevel milling element 60. Thus the bevel milling element 60 is secured at a location in channel 62 between side 63 and locking element 68, with cutting edge 61 facing the bottom end of milling head 30 as shown in FIG. 3.

Bevel milling element 60 or outer diameter milling element 50 can have a neutral, positive or negative rake with a positive rake being preferred. An advantage of the design of milling head 30 is that outer diameter milling element 50 and/or bevel milling element 60 can be replaced easily once cutting edge 51 and/or 61 becomes worn or the like. If desired, outer diameter milling element 50 and bevel milling element 60 have one or more cutting edges which are a chip breaker edge, as known in the art, that tapers from a thicker portion to a relatively sharp point to provide a clean finish to the tube end. Bevel milling element 60 can have any desired shape so long as the noted beveling function can be carried out.

As noted, the outer diameter milling element 50 can be positioned at any desired location along track 54 of milling element support 42. Likewise, bevel milling element 60 can be positioned at generally any desired location along channel 62 of milling element support 42. Thus, the depth and length to which a tube is milled from an end portion thereof can be easily modified by a user to desired specifications. The distances between bevel milling element 60, cutting edge 61, and outer diameter milling element 50 cutting edges 51, 57 can be adjusted as described herein to impart a desired finish to a tube end.

The milling heads of the present invention are preferably formed utilizing a CNC machining system. Milling heads 30 are preferably formed from a suitable metal such as medium carbon alloy steel, high carbon alloy steel, stainless steel, or similar metals or alloys of metals. The milling head 30 is preferably formed out of a metal or metal alloy suitable to withstand a heat treating process which generally imparts a hard finish and durability to the milling head. The outer diameter milling element 50 can be formed out of a metal or metal alloy such as tool steel or carbide with carbide being preferred, as it provides long blade life and desirable wear characteristics. The bevel milling elements 60 of the present invention can be formed of the same materials as the outer diameter milling elements but are preferably formed of a tool steel.

Methods for utilizing milling head 30 are as follows. After determining the dimensions of the tube to be milled, such as inner diameter, outer diameter, or the like, the milling head 30 outer diameter milling element(s) 50 and bevel milling element(s) 60 are, individually, adjusted to relation to milling element support 42 and are adapted to impart a desired finish to the end 12 of a tube 10. Thus, bevel milling element 60 is adjusted and secured to channel 62 of milling element support 42, or directly to side 63 as described herein. Likewise, outer diameter milling element 50 is adjusted on guide 52 and secured to milling element support 42. Milling head 30 is attached through tool mounting portion 32 to a rotary milling tool. Rotary milling tool containing milling head 30 is preferably temporarily connected or secured to the tube to be milled utilizing a collet, or wedge system, or the like, as known in the art. The milling head 30 is then advanced towards tube 10, wherein depending on the configuration of the milling elements 50 and 60, contact with the tube is made with at least one of the cutting edges thereof. Outer diameter milling element 50 mills a predetermined outer circumference of the tube. Bevel milling element 60 contacts the tube end and mills a desired bevel into the tube. The milling head is further advanced along the tube as the milling operation is performed. Depending on the configuration of the milling elements, ant membrane and/or weld overlay present on the surface of the tube is also removed within the cutting sweep of the milling element cutting edges 51 and/or 61. After the desired milling operation has been performed, the rotary milling tool is disconnected from the tube leaving the tube having a beveled end and a section where material from the outer diameter of the tube has been removed for a predetermined distance adjacent the beveled end as illustrated in FIG. 3.

Figure 8:
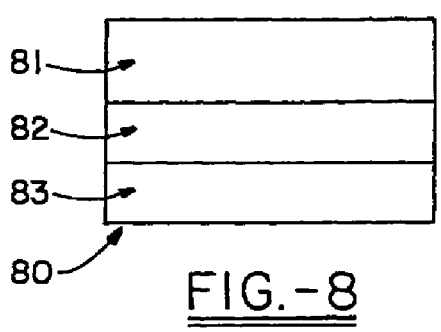
FIG. 8 is a side view of a gauge that is utilized to adjust the milling elements in one embodiment.
Figure 9:
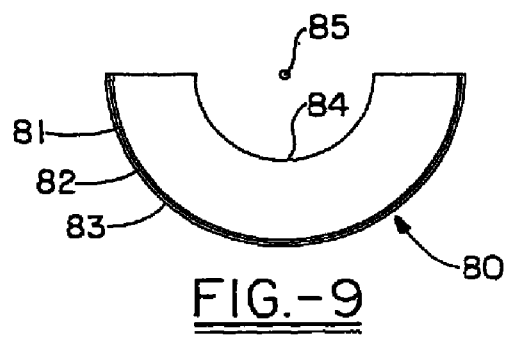
FIG. 9 is a bottom view of the gauge shown in FIG. 8.

In one embodiment, a gauge 80 is provided as illustrated in FIGS. 8 and 9 in order to aid in adjustment of the outer diameter milling element 50 present on milling head 30. When two or more outer diameter milling elements 50 are present on the milling head 30, the gauge 80 is utilized to co-align the multiple elements 50. Gauge 80 includes one or more alignment sections 81, 82 and 83 representing desired incremental steps that can be used to set outer diameter milling element 50 on milling head 30. Each section 81, 82, 83 has at least one surface that is located a predetermined radial distance from a gauge central axis 85. When gauge 80 is in position in relation to milling head 30 where an outer diameter milling element 50 can be adjusted, gauge central axis 85 is aligned or substantially aligned with central axis 31 of milling head 30. Each alignment section 81, 82, 83 is preferably located at a different radial distance from gauge central axis 85. In one embodiment, adjacent alignment sections have radial differences of about 0.010 inch (0.25 mm), 0.025 inch (0.63 mm) or 0.05 inch (1.27 mm).

Gauge 80 is desirably utilized after milling head 30 has been attached to a rotary milling tool. Inner surface 84 of gauge 80 is situated against a center shaft of a known diameter of the collet or other wedge system utilized. Outer diameter milling element 50 is advanced towards gauge 80 and a portion thereof is abutted against one of alignment sections 81, 82 or 83 to provide a desired milling element arrangement. Afterwards, the outer diameter milling element 50 is secured to milling head 30. This sequence is repeated until all outer diameter milling elements 50 are set in the same position. Afterwards, gauge 80 is removed and a desired milling operation is carried out.

In accordance with the patent statutes, the best mode and preferred embodiment have been set forth; the scope of the invention is not limited thereto, but rather by the scope of the attached claims.

What is claimed is:

1. A milling head for a rotary milling tool, comprising:
 a body adapted to be connected to a rotary milling tool, wherein the body has an annular recess, and one or more milling element supports connected to the body, wherein at least one milling element support includes a channel, a bevel milling element having a cutting edge, wherein the bevel milling element is adjustable in the channel, wherein the bevel milling element is connected via a pressure fit in the channel between a side of the milling element support and a side of a locking element, wherein at least one milling element support includes a guide, wherein an outer diameter milling element having a cutting edge is adjustable in relation to the guide, wherein the outer diameter milling element is connected via a pressure fit to the guide between a back of the milling element support and a fixing element, and wherein the bevel milling element has an annular cutting sweep that is at least concentric with an inner end of a cutting sweep of the outer diameter milling element and radially inward a distance from the outer diameter milling element cutting sweep.

2. The milling head according to claim 1, wherein the channel includes a back that longitudinally extends on the milling element support at an angle of 0° to about 45° in relation to a central rotational axis of the milling head, and wherein a portion of the bevel milling element contacts the back.

3. The milling head according to claim 1, wherein the milling element support guide comprises a track that extends longitudinally at an angle measured perpendicular to a central rotational axis of the milling head of from 0° to about 45°, and wherein a portion of the outer diameter milling element contacts the track.

4. The milling head according to claim 1, wherein the fixing element is connected to the milling element support by a securing element.

5. The milling head according to claim 4, wherein the guide includes a track that extends longitudinally at an angle measured perpendicular to a central axis of a milling head of from 0° to about 45°, and wherein a portion of the outer diameter milling element contacts the track and is movable along the track before being secured to the milling head.

6. The milling head according to claim 5, wherein the fixing element includes a foot that extends into a recess of the milling element support in a secured position to aid in locking the outer diameter milling element to the milling element support.

7. The milling head according to claim 6, wherein the guide back has a surface that extends in a plane substantially radial to the central axis, and wherein one cutting edge of the outer diameter milling element has a longitudinal axis that is fixed at an angle with respect to a central axis of the milling head of 0° to about 30°.

8. The milling head according to claim 1, wherein the milling element support channel has a back that extends longitudinally on the milling element support in a direction in relation to a central rotational axis of the milling head at an angle from 0° to about 45°.

9. The milling head according to claim 8, wherein a portion of the bevel milling element contacts the channel back.

10. The milling head according to claim 9, wherein the locking element is secured to the milling element support with a securing element, wherein the channel back extends longitudinally at an angle from 0° to about 20° with respect to the central axis, and wherein the bevel milling element cutting edge is fixed at an angle of from about 20° to about 60° in relation to the central axis.

11. A milling head for a rotary milling tool, comprising:
 a body having an annular recess, the body adapted to be connected to a rotary milling tool;
 one or more milling element supports connected to the body, wherein the milling element support includes a guide; and
 an outer diameter milling element having a cutting edge adapted to remove material from an outer diameter of a tube, wherein the outer diameter milling element is adjustable in relation to the guide and is secured between a back of the guide and a fixing element, wherein the fixing element is connected to the milling element support by a securing element that extends through the fixing element and is connected in a bore of the milling element support.

12. The milling head according to claim 11, wherein the guide includes a track that extends longitudinally at an angle measured perpendicular to a central rotational axis of the milling head of from 0° to about 45°.

13. The milling head according to claim 12, wherein a portion of the outer diameter milling element contacts the track and is movable along the track before being secured to the milling head.

14. The milling head according to claim 12, wherein the fixing element includes a foot that extends into a recess of the milling element support in a secured position to aid in locking the outer diameter milling element to the milling element support.

15. The milling head according to claim 12, wherein the guide back has a surface that extends in a plane substantially radial to the central axis.

16. The milling head according to claim 15, wherein the cutting edge of the outer diameter milling element has a longitudinal axis that is fixed at an angle with respect to the central axis of the milling head of 0° to about 30°.

17. The milling head according to claim 16, wherein the cutting edge longitudinal axis is fixed at an angle with respect to the central axis of the milling head of about 5° to about 15°.

18. The milling head according to claim 16, wherein a bevel milling element having a cutting edge is connected in a channel of the milling element support, wherein the bevel milling element is adjustable in at least a direction parallel to the central axis in the milling element support channel, and wherein the bevel milling element has an annular cutting sweep that is at least concentric with an inner end of a cutting sweep of the outer diameter milling element and radially inward a distance from the outer diameter milling element cutting sweep.

19. The milling head according to claim 16, wherein the milling element support track is substantially perpendicular to the plane of the back.

* * * * *